Feb. 20, 1962 J. S. HAMILTON 3,021,767
MANUFACTURE OF BAGS

Filed Nov. 5, 1959 4 Sheets-Sheet 1

INVENTOR.
JAMES S. HAMILTON
BY
ATTORNEYS

Feb. 20, 1962  J. S. HAMILTON  3,021,767
MANUFACTURE OF BAGS

Filed Nov. 5, 1959  4 Sheets-Sheet 2

INVENTOR.
JAMES S. HAMILTON
BY
Kane, Dalsimer and Kane

ATTORNEYS

Feb. 20, 1962    J. S. HAMILTON    3,021,767
MANUFACTURE OF BAGS

Filed Nov. 5, 1959    4 Sheets-Sheet 3

INVENTOR.
JAMES S. HAMILTON

BY Kane, Dalsimer and Kane

ATTORNEYS

Feb. 20, 1962  J. S. HAMILTON  3,021,767
MANUFACTURE OF BAGS

Filed Nov. 5, 1959  4 Sheets-Sheet 4

INVENTOR.
JAMES S. HAMILTON

ATTORNEYS

United States Patent Office 3,021,767
Patented Feb. 20, 1962

3,021,767
MANUFACTURE OF BAGS
James S. Hamilton, Ridgewood, N.J., assignor to Potdevin Machine Co., Nyack, N.Y., a corporation of New York
Filed Nov. 5, 1959, Ser. No. 851,154
4 Claims. (Cl. 93—35)

This invention relates to improvements in the manufacture of bags and to an improved bag having a cuff such as a handle bag and also to a blank for use in completing a bag of this type.

Paper bags and other bags made of natural and synthetic flexible films and sheets are generally manufactured by a series of forming, cutting and folding operations capable of being automatically performed on automatic machinery. However, in certain instances, it is desirable to provide a cuff around the open end of the bag. Thus, in the case of a handle type bag, such as a shopping bag, an integral reinforcing cuff is generally provided around the inner surface of the open upper end of the bag. The handles are secured to patches mounted beneath the cuffs and they project outwardly through openings provided in the bag or cuff. The operations for forming the inturned cuff and for securing the handles in position have generally been manually performed and do not readily lend themselves to automation.

It is a primary object of the present invention to overcome the difficulties and disadvantages heretofore encountered and to provide an improved bag having a cuff around its open end, such as a handle bag, and to an improved blank from which the bag can be completed and also to an improved method whereby the bag and blank can be made by simple operations capable of being sequentially performed either manually or automatically by a machine.

A further object is the provision of a method, blank and bag of the above character wherein the blank and bag are formed, cut and folded in an improved simplified manner which is particularly suited for automatic production.

Among other objects of the present invention is the provision of an improved bag having a reinforcing cuff around the open end, particularly a handle type bag, which requires a minimum surface area for storage and shipment which may be readily opened by the user and which, when only partially opened, is so constructed as to facilitate the insertion of articles into the bag.

My invention contemplates the provision of a bag which, when folded, has a body portion in the form of a flattened, pleated tube having an open end to provide access to the interior. The folded, flattened tube comprises superimposed front and rear panels having their corresponding longitudinal edges connected together by inwardly folded, pleated sides. An inwardly folded cuff extends around the open end and, in the folded bag, takes the form of a pair of flaps connected to the front and rear panels and a pair of flaps secured to the pleated sides with the side edges of adjacent flaps being arranged in overlapping relationship with a gusset or tuck interconnecting the overlapping portions. Adjacent the open end of the bag, the pleated sides are formed with gussets in the form of inverted isosceles triangles having their bases integrally connected with the inturned cuff flaps at the sides of the bag. The pleats serve to conserve surface area in the folded bag and also to facilitate the self-opening thereof. The gussets provide for simple folding operations in the manufacture of the bag and blank suitable for sequential performance on automatic machinery. They also provide camming surfaces which facilitate the filling of the bag when it is only partially opened. A handle may be readily associated with the bag by mounting a patch which supports the handle beneath the cuff and extending the handle outwardly through openings provided in the cuff or bag.

My improved bag may be readily produced by a sequence of relatively simple operations which may be performed manually or automatically. Thus, a pleated tube is first made from a web or sheet of flexible material such as paper and fiber. Two transverse score or fold lines are then formed adjacent an open end of the tube. The distance between the end of the tube and the first score line represents the height or depth of the cuff. The distance between the first and second score lines should be substantially equal to the depth of the pleats. Thereafter, the face of the tube, at the scored end, is opened by folding one or both layers outwardly along the second score line until the face is completely open with the two layers disposed at an angle of approximately 180° to each other. Simultaneously with the opening of the face, and as a part thereof, a pair of gussets, in the form of inverted isosceles triangles, are formed between the pleated sides and the first score line or cuff. In addition, the cuff portion projects outwardly with respect to the face of the end of the tube. Simultaneously with or sequentially after the opening of the face, the side portions of the cuff are folded inwardly in the form of two flaps and the portion of the cuff secured to the front and rear panels of the bag tube are folded outwardly into the plane of the open face. At this stage, the tube constitutes a bag blank which may be used subsequently for completion into a handle-type bag or into a bag simply having a reinforcing cuff. In completing the bag, the portions of the cuff secured to the front and rear panels are folded inwardly parallel to the face of the bag in the form of flaps which overlap the flaps at the sides of the bag and are connected thereto by gussets or tucks. Where handles are employed, they are assembled with the bag before the last-mentioned flaps are folded in. The bag may be store and shipped in this form or, if desired, the outer layer of the face may be folded inwardly and in parallel relationship with the under layer of the face.

In the accompaying drawings.

Figure 3:
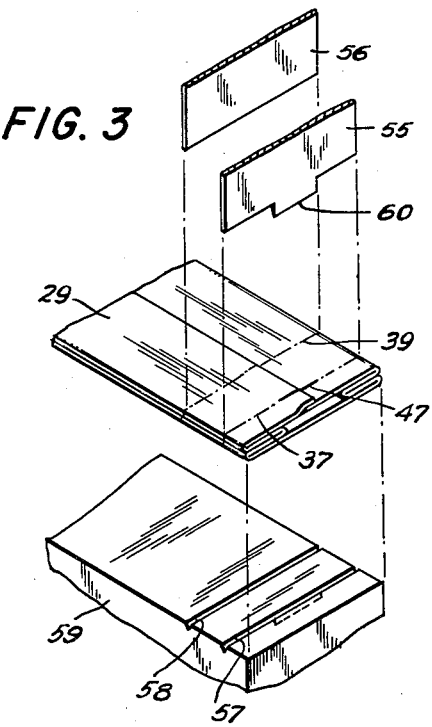

FIG. 3 is a fragmentary perspective view illustrating the step of forming fold or score lines transversely of the tube adjacent the upper end thereof for defining the depth of the cuff and also the height of the gusset and for providing the central fold line along which the face or end of the bag is opened. The step of providing openings in the cuff or tube for receiving the handle is also illustrated.

Figure 4:
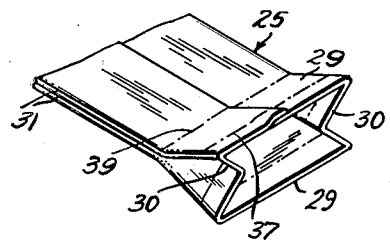
Figure 5:
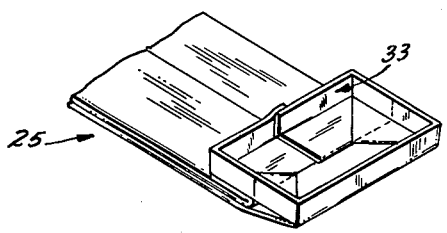
Figure 6:
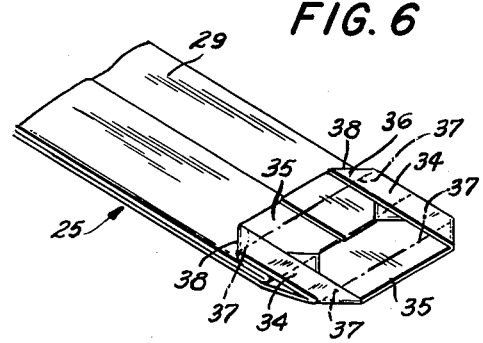
Figure 7:
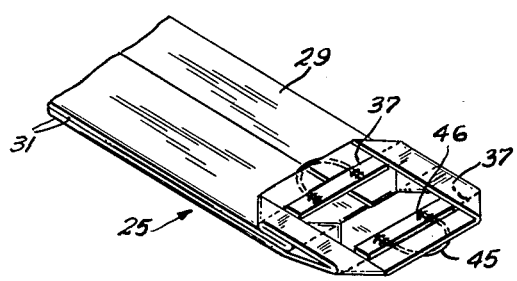
Figure 8:
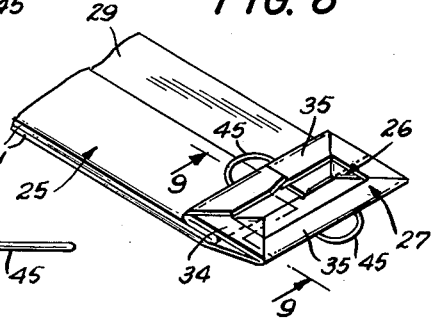
Figure 9:
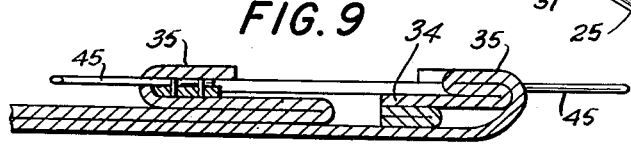
Figure 10:
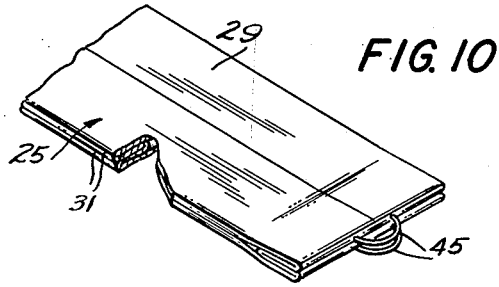
Figure 11:
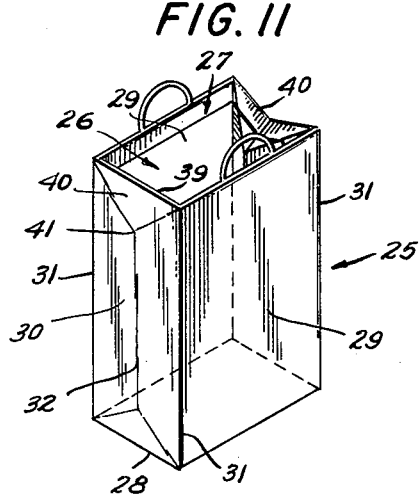
Figure 12:
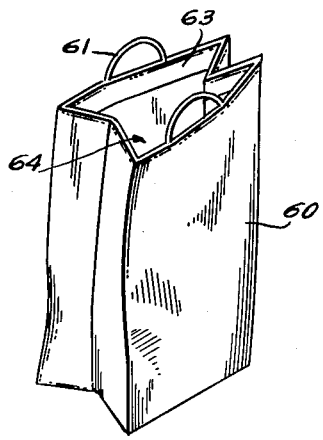
Figure 13:
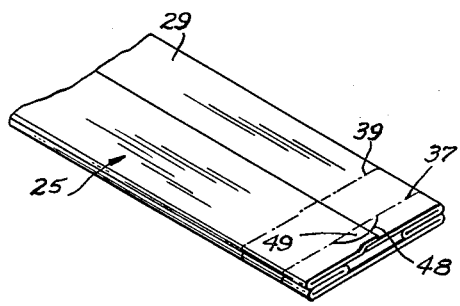
Figure 14:
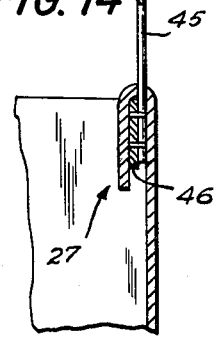
Figure 15:
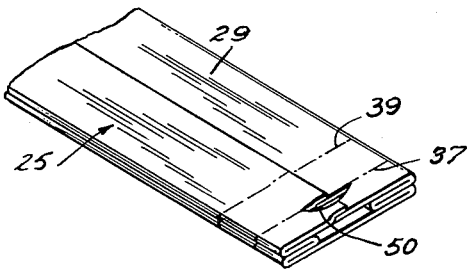
Figure 16:
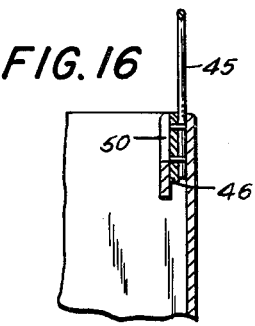
Figure 17:
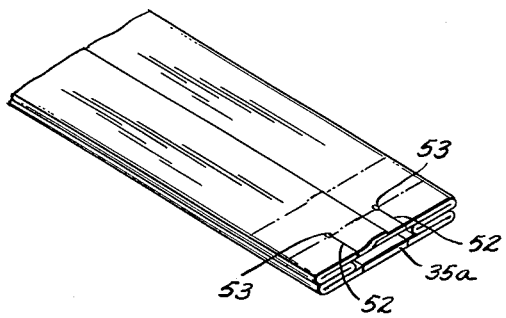
Figure 18:
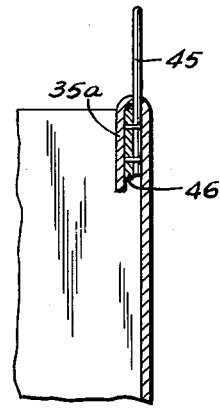
Figure 19:
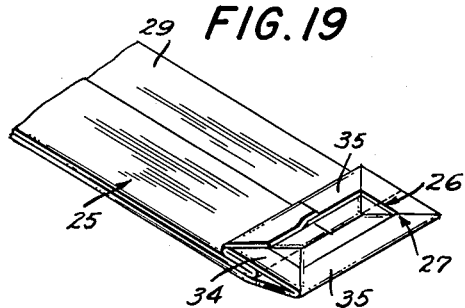
Figure 20:
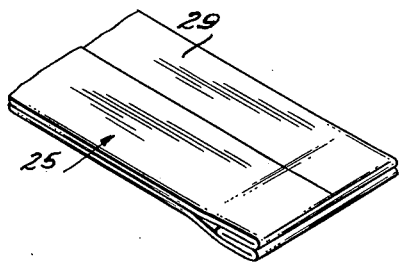

FIGS. 4 and 5 are fragmentary perspective views showing the end of the tube in partially opened and fully opened positions;

FIG. 6 is a fragmentary perspective view of my improved bag blank with the end of the tube in fully opened position and with the side flaps of the cuff folded inwardly;

FIG. 7 is a view similar to FIG. 6 and illustrates the operation for inserting the handles through the openings provided for this purpose;

FIG. 8 is a similar view of the completed bag with the face in open position showing the front and rear flaps of the cuff folded inwardly over the handle patches with their ends overlapping the ends of the side flaps;

FIG. 9 is a detailed sectional view of the folded end of the tube or bag in the direction of the arrows of line 9—9 of FIG. 8;

FIG. 10 shows a completed bag with the face of the bag in closed position with portions broken away to illustrate the arrangement of the gussets at the sides of the bag;

FIG. 11 is a perspective view of the completed bag in partially opened position illustrating the manner in which the gussets facilitate the filling of the bag;

FIG. 12 is a similar view of one conventional type of handle bag in partially opened position illustrating the manner in which the filling of the bag is obstructed;

FIG. 13 is a perspective view of a partially formed bag showing an alternate form of handle-receiving opening;

FIG. 14 is a detailed sectional view of the cuff portion of a completed bag having an opening of the type shown in FIG. 13 with the handle assembled therewith;

FIG. 15 is a perspective view of a partially formed bag showing a further modified handle-receiving opening;

FIG. 16 is a detailed sectional view of the cuff portion of a completed bag having an opening of the type shown in FIG. 15 with the handle assembled therewith;

FIG. 17 is a perspective view of a partially formed bag showing still another form of handle-receiving opening;

FIG. 18 is a detailed sectional view of the cuff portion of a completed bag having an opening of the type shown in FIG. 17 with the handle assembled therewith;

FIG. 19 is a view similar to FIG. 8 showing the bag with its face in open folded position having a reinforcing cuff embodying my invention but without any handle attached thereto; and FIG. 20 is a perspective view similar to FIG. 10 showing the bag of FIG. 19 with the face in closed position.

My invention is particularly applicable to bags made from paper and fiber such as kraft, but it should also be understood that it is applicable to bags made from flexible films, sheets and webs made from other natural or synthetic materials.

Completed bags embodying my invention are shown in FIGS. 8 to 11, 19 and 20. The detailed construction of the bag will be more fully understood after reviewing the method of making the bag. Before reviewing the method, however, I wish to point out that the bag consists generally of a body portion 25 of generally tubular form having an open upper end 26 with an inturned reinforcing cuff 27 extending around the inner edge thereof. The opposite end is provided with any desired type of bottom closure such as rectangular closure generally referred to as a square end and indicated in FIG. 11 at 28.

The tubular body of the bag consists of similar front and rear panels 29 which, when the bag is in flat folded position, are arranged in superimposed relationship in alignment with each other as shown most clearly in FIGS. 10 and 20. The corresponding longitudinal edges of the front and rear panels 29 are integrally connected together by pleated sides 30. Fold lines 31 connect the front and rear panels to the pleated sides. The pleated sides are folded inwardly between the front and rear panels so that each side comprises two similar sections connected together at the center by longitudinal fold line 32. When the bag is in flat folded position, the two sections of each pleated side is disposed in contact with each other and with the inner surface of the side marginal areas of the front and rear panels as shown in the broken away portion of FIG. 10.

The reinforcing cuff 27 extending around the top of the bag comprises a pair of inturned side flaps 34 connected to the pleated sides of the bags and a pair of inturned front and rear flaps 35 integral with the upper edge of the front and rear panels. When the bag is in open face or closed face position, as shown in FIGS. 8, 10, 19 and 20, the edges of adjacent flaps 34 and 35 are in overlapping relationship. Either of the adjacent flaps may overlap each other. However, I prefer to have the front and rear flaps overlap the side flaps since it simplifies the folding and production of the bag. The overlapping portions of the flaps are connected together by gussets or tucks 36 of triangular shape, which are integrally connected to the end folded flaps 34 by transverse fold lines 37 and are integrally connected to the superimposed flaps 35 by the diagonal fold lines 38. The transverse fold line 37 extends completely across the tube or bag and serves to integrally connect the flaps 35 to the front and rear panels 29. The flaps 34 are integrally connected to the pleated sides by the same fold lines 37. It will thus be seen that score lines or fold lines 37 serve to define the depth or height of the cuff. When the flaps 34 and 35 are folded inwardly, they are preferably secured in place by a suitable adhesive adjacent the central portion thereof. However, the adhesive is not applied to the overlapping portions or gussets 36 so as to avoid interference with the opening of the bags.

Adjacent the open end of the bag, the pleated sides are provided with gussets 40 in the form of inverted isosceles triangles. The apex 41 of the gussets point downwardly and merge with the center fold line 32 of the pleated sides, while the base of the triangle is the fold line 37 along which the side flaps 34 are folded. In order to provide for proper folding of the bag, the height of the triangle is approximately equal to the depth of the pleats at the sides of the folded tube. In other words, the altitude of the isosceles triangle is approximately equal to one-half the width of the pleated sides.

In the form of bag shown in FIGS. 19 and 20, no handles are provided and the cuff 27 serves primarily to reinforce the open end of the bag. In FIGS. 3 to 18, provision is made for the mounting of handles 45 so that they project upwardly above the upper edge of the bag. Any type of handle may be employed. The illustrated handle consists of a loop made of suitable flexible material, such as fiber, supported on a base in the form of a fiber patch 46 by suitable means such as staples as shown at 47. The patches 46 are mounted inside the cuff flaps 35 at the front and rear of the bag as by being adhesively secured therein and the handles project outwardly through various types of openings which may be provided in the cuff or bag.

In the form of my invention shown in FIGS. 3 to 11, the opening consists of centrally disposed slits 47 provided along the central portion of fold lines 37 and the handles may be readily projected outwardly through the slits.

In the form of my invention shown in FIGS. 13 and 14, arcuate slits 48 are extended upwardly above the central portion of fold lines 37, thereby providing a flap 49. Flap 49 is extended outwardly between the two ends of the handles and adhesively secured in place, thereby reinforcing the mounting for the handles.

In the form of mounting shown in FIGS. 15 and 16, I simply provide openings 50 of crescent or half moon shape and the patch 46 is mounted inside the cuff in the usual manner with handle 45 projecting outwardly through the opening 50.

In the form of handle mounting shown in FIGS. 17 and 18, I provide additional reinforcement for the handle. In this form of mounting, I provide spaced slots 52 extending inwardly from the open edge of the cuff flaps 35 in parallel relationship to each other and to the sides of the bag and terminating in circular apertures 53. The patch 46 is mounted inside the cuff and the central flap area 35A is extended over the patch between the two ends of the handle and adhesively secured in position as shown in FIG. 18.

By referring to the method of making my bag, a fuller understanding will be obtained of the construction thereof.

Figure 1:
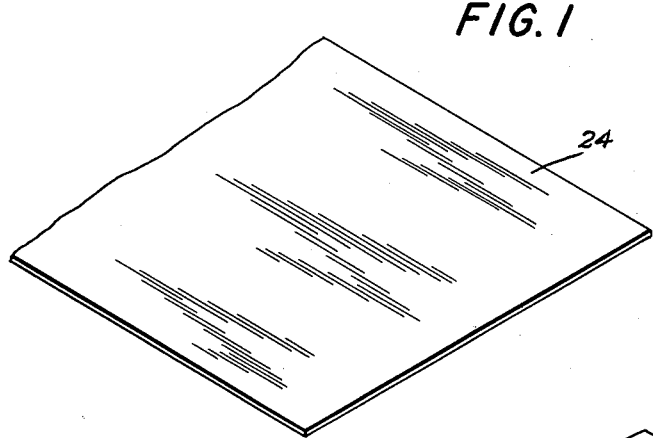
FIG. 1 illustrates a portion of a flat web sheet or film suitable for use in making a bag embodying my invention.

As previously indicated my bag may be made from a web of paper or fiber or from a flexible sheet or film of other suitable natural or synthetic material. Thus, in FIG. 1 I have shown the end portion of a web 24 of flexible material from which the bag may be made. While from the standpoint of simplicity I prefer to use only a single web in making the bag tube, it should be appreciated that more than one web may be employed if desired.

Figure 2:
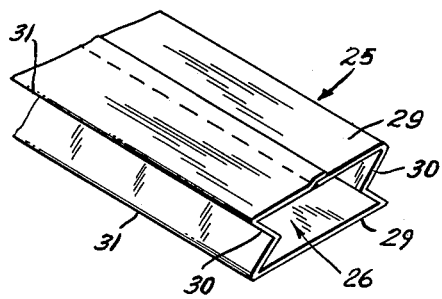
FIG. 2 illustrates a pleated tube formed from the web in making my improved bag.

The web 24 is first folded longitudinally in the manner indicated in FIG. 2 into a tube 25 having open end 26 and similar front and rear panels 29 interconnected by inwardly folded, pleated sides 30. The pleated sides are each formed of two similar sections connected to the side edges of the panels by score lines or fold lines 31 and connected to each other by score line or fold line 32.

The tube is shown in FIG. 2 with the front and rear panels in spaced relationship. Preferably the tube is folded or pressed into the flattened position shown in FIG. 3 for the succeeding operation. Thereafter a pair of transverse score lines 37 and 39 are formed completely around the tube adjacent the open end thereof. This may be accomplished in any suitable fashion, as by means of the scoring blades 55 and 56 which press the scored portions of the tube into the grooves 57 and 58 in the supporting platen 59. The first score line 37 is positioned a distance from the open end of the bag tube equal to the desired height of the proposed cuff. The second score line 39 is spaced from the first score line a distance approximately equal to the depth of the pleated sides when the bag tube is in flat, folded position. In other words, the distance between the two score lines is approximately equal to one-half the width of a pleated side of the bag.

Where it is desired to assemble a handle with the bag, an opening may be made in each of the panels 29, simultaneously with the forming of the score line 37. For this purpose the scoring blade 55 is shown as provided with a cutting blade section 60 centrally thereof which pierces through the two panels of the bag tube when the score line 37 is formed as shown at 47.

After the tube has thus been provided with two transverse score lines, the tube is folded to open faced position in the manner shown in FIGS. 4, 5 and 6. Thus the end portion of one or both of the panels is folded relative to the other panel along the second score line 39 until the two end portions of the panel are disposed at an angle of approximately 180° to each other. At the same time I form a pair of gussets 40 in the two pleated sides of the bag tube in the form of inverted isosceles triangles with the apex of the triangle positioned at the center point of the score line 39 on each side of the bag and with the base of the triangle extending along the first score line 37. When the face of the bag tube is thus opened it causes an upstanding collar 33 to be formed around the open end of the tube between the first score line 37 and the end of the tube as shown in FIG. 5.

Either simultaneously with the forming of the open face or sequentially thereafter, the two sides portions of the upstanding collar are folded inwardly and downwardly along score line 37 in the manner shown in FIG. 6 so as to provide a first pair of cuff flaps 34 at the two sides of the open face. The front and rear portions of the collar are simultaneously folded outwardly and downwardly into a second pair of flaps 35 which at this step in the manufacture of the bag are unfolded and are positioned in the same plane as the open faced end portions of the front and rear panels to which they are connected. The two pairs of flaps are interconnected at their side edges by triangular gussets 36 which are connected to the side flaps by the score lines 37 and to the front and rear flaps by the angular fold lines 38.

If it is desired to produce a bag having a re-enforcing cuff without any handles assembled therewith, it will be appreciated it will not be necessary to provide pierced openings 47. The bag may be completed into a re-enforced cuff type of bag by folding the two flaps 35 inwardly and downwardly along the score lines 37 as shown in FIG. 19. The two pair of flaps are thus folded into engagement with the inner surface of the bag tube and they form a re-enforcing cuff extending completely around the open end of the tube. The side edges of the front and rear flaps 35 are disposed in overlapping relationship with the side edges of the two side flaps 34 and are connected thereto by the gussets 36. The cuff flaps may be secured in inwardly folded position by a suitable adhesive applied to the under surface of the flaps or to the inner surface of the bag tube. The interconnecting gusset portions 36 should be kept free from adhesive so as not to interfere with the opening of the bag. When the bag has thus been completed, the face of the bag may be closed as shown in FIG. 20 by folding the two end portions of the panels into engagement with each other.

Either prior to the forming and folding of the open end of the bag, as described above, or simultaneously therewith, or subsequent thereto, a suitable bottom closure is applied to the bag tube. Any type of bottom closure may be provided, such as the square end or square bottom indicated at 28 in FIG. 11.

The bag tube shown in FIG. 6 serves as a bag blank which may be completed at a later time into a bag simply having a re-enforcing cuff extending therearound or into a bag having desired type of handle assembled therewith. The bag blank may be stored for completion into a bag at a later date or may be immediately processed and completed into a bag. When it is desired to assemble handles with the bag, I provide suitable handle members such as those illustrated in the drawings and consisting of handle loops 45 made of a suitable flexible material, such as fiber, attached to a supporting patch 46 as by means of staples. The handle members may be assembled with the bag tube in the manner shown in FIGS. 7 and 8. Thus a pair of handle members are placed in contact with the open face of the tube and the loops 45 are extended outwardly through the openings 47. The second pair of flaps 35 are then folded inwardly over the supporting patches 46. The patches 46 are adhesively secured to the inner surface of the flap and to the inner surface of the front and rear panels. When the assembly has thus been completed the face of the bag may be closed by folding one or both panel ends relative to each other until they are in engagement as shown in FIG. 10.

Alternate forms of handle assemblies which have been previously described are shown in FIGS. 13 and 18 and these are similarly assembled by inserting the handle loops 45 outwardly through the openings and folding the flaps 35 inwardly and downwardly over the supporting patches. In the form shown in FIGS. 13 and 14 are re-enforcing flap 49 is extended through the handle loop and over the patch 46 and is adhesively secured thereto, thereby strengthening the handle mounting. In the form shown in FIGS. 17 and 18, the flap 35a is extended through the handle loop and adhesively secured over the supporting patch, likewise re-enforcing the handle mounting.

It will thus be seen that I have provided an improved bag of the type having a re-enforcing cuff extending around the open end thereof, such as a handle bag, which is so formed and folded that it can be readily made by relatively simple operations which can be sequentially performed either manually or automatically.

In using a bag embodying my invention, it will be appreciated that since it is of the self-opening type, it may be readily opened for use. When the bag is in partially opened position, access to the bag is not obstructed but, as a matter of fact, it will be facilitated as shown in FIG. 11. Thus the gussets 40 provide camming surfaces at the two sides of the bag which slope inwardly so as to guide any article inserted from the side of the bag directly into the bag. This freedom from obstruction is in contrast to the conventional handle bags heretofore available, as for example, the type shown in FIG. 12. The bag is shown generally at 60 and has a pair of handle members 61. A re-enforcing cuff is manually formed around the open end of the bag as shown at 63. The illustrated bag has pleated sides 64 which extend to the top of the bag. In the partially opened position illustrated in FIG. 12, the gussets project inwardly at the top of the bag and form obstructions interfering with ready access to the inside of the bag.

It should be understood that modifications may be made in the illustrated and described improvements of my invention without departing from the invention as set forth in the accompanying claims.

I claim:

1. The method of making a bag of the type having a re-enforcing cuff which comprises: first forming sheet material into a flattened, pleated tube having an open end and having front and rear panels in superimposed relationship interconnected by inwardly folded, pleated sides each formed of two similar sections connected to the sides edges of the front and rear panels and to each other by longitudinal fold lines; then providing the said tube with a pair of transverse score lines adjacent the open end thereof with the first score line spaced from the end of the tube a distance equal to the height of the cuff and the second score lines spaced from the first score line a distance queal to the depth of the pleat when the tube is in flat folded position; then folding the open end of at least one of the two panels outwardly with respect to the other panel along the said second score line thereby providing an open face with the two end portions of the panels disposed at an angle of approximately 180° to each other, and forming simultaneously therewith two gussets at the two pleated sides of the bag in the form of inverted isosceles triangles extending between the said first and second score lines, the forming of said open face resulting in an upstanding collar folded along the said first score line and extending completely around the open end of the tube; and then folding the two opposite sides of the collar inwardly and downwardly along the first score line forming a first pair of inwardly folded cuff flaps integrally connected with the base portions of the gussets at the sides of the tube and folding the front and rear portions of the collar inwardly and downwardly along the said first score line, forming a second pair of inwardly folded cuff flaps having their end portions arranged in overlapping relationship with the end portions of said first pair of cuff flaps and connected thereto by triangular gussets; and providing openings in the front and rear panels of the tube adjacent the first score line and assembled handle members having a supporting base and a projecting loop inside the second pair of flaps with the loops projecting outwardly through the openings prior to the time that the front and rear portions are folded downwardly to form the second pair of flaps.

2. The method of making a bag of the type having a pair of handles supported inside a re-enforcing cuff which comprise: first forming sheet material into a flattened, pleated tube having an open end and having front and rear panels in superimposed relationship interconnected by inwardly folded pleated sides each formed of two similar sections connected to the side edges of the front and rear panel and to each other by longitudinal fold lines; then forming a pair of transverse score lines adjacent to the open end of the tube with the first score line being spaced from the end of the tube a distance equal to the height of the cuff and the second score line being spaced from the first score line a distance approximately equal to the depth of the pleated sides when the tube is in flat folded position and also providing the tube with openings in the front and rear panels adjacent the first score line; then folding the open end of at least one of the two panels outwardly with respect to the other panel along the second score line thereby providing an open face with the two end portions of the panels disposed at an angle of approximately 180° to each other, and forming simultaneously a pair of gussets in the two pleated sides of the bag in the form of inverted isosceles triangles extending between the said first and second score lines, the form of said open face resulting in an upstanding collar of the same height as the proposed cuff extending completely around the open end of the tube and connected thereto by said first score line; then folding the two sides of the collar inwardly and downwardly along the said first score line forming a first pair of inwardly folded cuff flaps; and lastly providing a pair of handle members in the form of supporting patches having loops secured thereto and placing the patches in contact with the exposed surfaces of the open face of the tube and inserting the loops through the openings and folding the front and rear portions of the collar inwardly and downwardly over the supporting patches forming a second pair of inwardly folded cuff flaps, with the ends of the second pair of flaps being disposed in overlapping relationship to the first pair of cuff flaps and connected thereto by triangular gussets.

3. The method of making a bag of the type having a pair of handles as set forth in claim 2 in which the flaps are adhesively secured in inwardly folded position.

4. The method of making a bag of the type having a pair of handles as set forth in claim 2 in which the open face of the tube is closed by folding the end portions of the front and rear panels into contacting engagement with each other after said first and second pairs of flaps have been formed.

References Cited in the file of this patent
UNITED STATES PATENTS

| Re. 21,228 | Steen | Oct. 3, 1939 |
| 2,062,617 | Steen | Dec. 1, 1936 |
| 2,221,617 | Steen | Nov. 12, 1940 |
| 2,346,710 | Steen | Apr. 18, 1944 |
| 2,722,165 | Yount | Nov. 1, 1955 |